(12) United States Patent
Steinberger et al.

(10) Patent No.: US 8,979,217 B2
(45) Date of Patent: Mar. 17, 2015

(54) ELECTRO-PNEUMATIC PRESSURE REGULATION MODULE COMPRISING PRESSURE REGULATION CHANNELS HAVING SEPARATE PNEUMATIC CIRCUITS

(75) Inventors: Juergen Steinberger, Puchheim (DE); Péter Frank, Budapest (HU); Michael Herges, Munich (DE); Martin Mederer, Neumarkt (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 304 days.

(21) Appl. No.: 13/201,430

(22) PCT Filed: Feb. 18, 2010

(86) PCT No.: PCT/EP2010/001019
§ 371 (c)(1),
(2), (4) Date: Dec. 12, 2011

(87) PCT Pub. No.: WO2010/094481
PCT Pub. Date: Aug. 26, 2010

(65) Prior Publication Data
US 2012/0080935 A1    Apr. 5, 2012

(30) Foreign Application Priority Data
Feb. 20, 2009  (DE) .......................... 10 2009 009 811

(51) Int. Cl.
*B60T 13/68* (2006.01)
*B60T 8/32* (2006.01)
(Continued)

(52) U.S. Cl.
CPC .................. *B60T 8/327* (2013.01); *B60T 8/343* (2013.01); *B60T 8/3675* (2013.01); *B60T 13/683* (2013.01)
USPC .................................................. 303/15; 303/7

(58) Field of Classification Search
USPC ............... 303/9.66, 15, 118.1, 119.3, 122.15, 303/127, 123, DIG. 10
See application file for complete search history.

(56) References Cited

U.S. PATENT DOCUMENTS 4,260,199 A * 4/1981 Reinecke ....................... 303/127
4,436,347 A * 3/1984 Stumpe ......................... 303/6.01
(Continued)

FOREIGN PATENT DOCUMENTS

DE    3212930 A1 * 10/1983 ............. B60T 13/26
DE    101 49 918        5/2003
(Continued)

OTHER PUBLICATIONS

Wrede J et al : "Brake by Wire for Commercial Vehicles", SAE Transactions, Society of Automotive Engineers, Inc., Warrendale, PA, US, vol. 101, No. 922489, Jan. 1, 1992, pp. 849-859, XP000473008, ISSN: 0096-736x, p. 852-p. 853 ; Figure 5, 7.

(Continued)

*Primary Examiner* — Bradley King
*Assistant Examiner* — Stephen Bowes
(74) *Attorney, Agent, or Firm* — Kenyon & Kenyon LLP

(57) ABSTRACT

An electropneumatic pressure regulating module, formed as a structural unit, is described for an electropneumatic brake system of a vehicle, including: at least two separately regulable pressure regulating channels, wherein a regulated working pressure, acting at at least one working pressure port, for at least one brake application device of the brake system is generated for each pressure regulating channel on the basis of working air originating from at least one compressed air store and as a function of braking demand signals of a brake transducer, in which to form pressure regulating channels having separate pneumatic circuits, each pressure regulating channel is assigned at least one dedicated storage pressure port which can be connected to a dedicated compressed air store, and in which the pneumatic flow paths of each pressure regulating channel are formed so as to be pneumatically separate, at least proceeding from the respective storage pressure port as far as the respective working pressure port, from the pneumatic flow paths of a respective other pressure regulating channel.

14 Claims, 3 Drawing Sheets

(51) Int. Cl.
*B60T 8/34* (2006.01)
*B60T 8/36* (2006.01)

(56) References Cited

U.S. PATENT DOCUMENTS

| | | | | |
|---|---|---|---|---|
| 4,585,278 | A | * | 4/1986 | Grauel et al. ..................... 303/7 |
| 4,632,466 | A | * | 12/1986 | Grauel et al. ..................... 303/7 |
| 5,120,114 | A | * | 6/1992 | Schlichenmaier et al. ... 303/123 |
| 5,328,251 | A | * | 7/1994 | Brearley .......................... 303/9 |
| 7,201,585 | B2 | * | 4/2007 | Pirner et al. ................. 439/76.1 |
| 2003/0025388 | A1 | | 2/2003 | Roether et al. |
| 2005/0116533 | A1 | * | 6/2005 | Herges et al. ..................... 303/3 |

FOREIGN PATENT DOCUMENTS

| | | |
|---|---|---|
| DE | 10 2007 021646 | 11/2008 |
| DE | 10 2007 037346 | 2/2009 |
| DE | 102007037346 | 2/2009 |
| EP | 110119 A1 * | 6/1984 .............. B60T 17/22 |
| EP | 1 122 142 | 8/2001 |
| EP | 1 275 570 | 1/2003 |
| EP | 1436181 | 2/2006 |
| GB | 2 448 007 | 10/2008 |
| WO | 2006/103636 | 10/2006 |
| WO | 2008138469 | 11/2008 |

OTHER PUBLICATIONS

International Search Report for PCT/EP2010/001019, dated Aug. 13, 2010.

European Patent Office, Translation of International Preliminary Report on Patentability, Sep. 1, 2011, from International Patent Application No. PCT/EP2010/001019, filed on Feb. 18, 2010.

* cited by examiner

ELECTRO-PNEUMATIC PRESSURE REGULATION MODULE COMPRISING PRESSURE REGULATION CHANNELS HAVING SEPARATE PNEUMATIC CIRCUITS

FIELD OF THE INVENTION

The present invention relates to an electropneumatic pressure regulating module.

BACKGROUND INFORMATION

An electropneumatic pressure regulating module, formed as a structural unit, is for electropneumatic brake systems of vehicles, having at least two separately regulable pressure regulating channels, wherein a regulated working pressure, acting at at least one working pressure port, for at least one brake application device of the brake system is generated for each pressure regulating channel on the basis of working air originating from at least one compressed air store and as a function of braking demand signals of a brake transducer.

A generic pressure regulating module is discussed in EP 1 122 142 A1. The known pressure regulating module is a 2-channel pressure regulating module as a rear axle module, wherein in each case one channel supplies braking or working pressure to one wheel brake of the rear axle. In contrast, the wheel brake cylinders of the front axle are aerated and deaerated by in each case one 1-channel pressure regulating module to which a supply is provided from a front axle compressed air store. Said 1-channel pressure regulating modules also have in each case one purely pneumatic backup circuit in order, in the event of an electrical failure, to still be able to brake by the pressure output from a foot brake valve. The two 1-channel pressure regulating modules of the front axle and the 2-channel pressure regulating module of the rear axle are actuated by an electronic control device arranged outside the pressure regulating modules.

In the event of a partial pneumatic failure of the front axle braking circuit, a switching valve assumes an emergency position in which a supply is provided to at least one of the two 1-channel pressure regulating modules of the front axle from a compressed-air store provided in addition to the front axle compressed air store. It is however a disadvantage here that an additional compressed air store is required in order to increase reliability against failure.

Furthermore, the 2-channel pressure regulating module of the rear axle is supplied with compressed air from a single compressed air store. It is a disadvantage here that, in the event of a failure of said compressed air store, or in the event of a crack in the store air line which supplies the 2-channel pressure regulating module, both pressure channels fail.

SUMMARY OF THE INVENTION

Therefore, a problem on which the exemplary embodiments and/or exemplary methods of the present invention is based is that of developing a pressure regulating valve of the type mentioned in the introduction in such a way that, with little expenditure, it has greater reliability against failure.

The object may be achieved according to the exemplary embodiments and/or exemplary methods of the present invention by the features as described herein.

The exemplary embodiments and/or exemplary methods of the present invention are based on the following:
a) to form pressure regulating channels which have separate pneumatic circuits, each pressure regulating channel is assigned at least one dedicated storage pressure port which can be connected to a dedicated compressed air store, wherein
b) the pneumatic flow paths of each pressure regulating channel are formed so as to be pneumatically separate, at least proceeding from the respective storage pressure port as far as the respective working pressure port, from the pneumatic flow paths of a respective other pressure regulating channel.

In this case, therefore, pressure regulating channels which have fully separate pneumatic circuits are provided proceeding from the respective compressed air store as far as the associated brake application devices, said pressure regulating channels having in each case a dedicated store air supply, such that the failure of the store air assigned to one pressure regulating channel cannot lead to a functional failure of the entire pressure regulating module, because the further pressure regulating channels remain functional on account of their separate supply of store air. Not least, no additional compressed air store is required aside from the compressed air stores assigned in any case to the pressure regulating channels.

This is advantageous in particular if a pressure regulating module according to the present invention has two pneumatically separate pressure regulating channels, of which one pressure regulating channel is assigned to one axle, for example a front axle, and one pressure regulating channel is assigned to a further axle, for example rear axle. Two-axle vehicles of said type form the vast majority of vehicles in particular in the utility vehicle field. It is then possible, in the event of a failure of one pressure regulating channel and therefore of the brakes of one axle, for braking to still be effected on the other axle.

It therefore may be preferable for a working pressure port for connecting at least one brake application device of one axle and at least one further working pressure port for connecting a brake application device of at least one further axle of the vehicle to be provided in the pressure regulating module according to the present invention.

Here, it is for example possible for a pressure regulating channel having a separate pneumatic circuit to be assigned to at least one front axle and a pressure regulating channel having a separate pneumatic circuit to be assigned to at least one rear axle, and for a pressure regulating channel having a separate pneumatic circuit to be assigned to at least one rear axle, and a pressure regulating channel having a separate pneumatic circuit to be assigned to at least one further rear axle.

Advantageous refinements of and improvements to the exemplary embodiments and/or exemplary methods of the present invention specified in the independent claims are possible by the measures specified herein.

To form an electropneumatic brake system with primarily electrically actuated pressure regulating channels and a subordinate pneumatic fallback level in the event of a failure of the electrics, each pressure regulating channel is assigned a dedicated backup circuit, having a dedicated backup port for the introduction of a pneumatic backup pressure which is derived from the storage pressure of the compressed air store assigned to the respective pressure regulating circuit and which is formed by the brake transducer, from which backup pressure the working pressure at the working pressure port of the respective pressure regulating channel is formed in the event of a failure of electrical components.

In one refinement, the pneumatic flow paths of each backup circuit are then formed so as to be pneumatically separate, at least proceeding from the associated backup port as far as the associated working pressure port, from the pneumatic flow paths of a respective other backup circuit. This advantageously results in a further increase in functional reliability of the electropneumatic brake system, since then the backup circuits are also pneumatically fully separate from one another, and therefore leaks in one backup circuit do not lead to a failure in another backup circuit.

Alternatively, in the case of vehicles in which the foot brake valve has only one pneumatic channel and which are to be retrofitted with the pressure regulating module according to the present invention, it would be possible for the pressure regulating module to have only a single backup port for the introduction of a pneumatic backup pressure generated by the brake transducer, from which backup pressure separate working pressures are formed at the working pressure ports of the pressure regulating channels by an integrated circuit separation arrangement in the event of a failure of electrical components. Pneumatically separate backup circuits downstream of the circuit separating arrangement in the flow direction are then likewise provided, which increase the reliability of the brake system against failure.

A pressure regulating module according to the present invention may include the following:
a) an electronic control device which executes all the routines necessary for the pressure regulation by the pressure regulating channels and which generates for each pressure regulating channel an electrical control signal corresponding to a setpoint working pressure as a function of electrical braking demand signals of the brake transducer,
b) for each pressure regulating channel, a dedicated electromagnetically actuated valve device which, as a function of the electrical control signals of the electronic control device, generates from the storage pressure of the associated compressed air store an actual working pressure for the working pressure port assigned to the respective pressure regulating channel,
c) for each pressure regulating channel, at least one pressure sensor which, as a function of the actual working pressure output by the associated electromagnetically actuated valve device, inputs a signal into the electronic control device for comparison with the respective setpoint working pressure, for the regulated aeration and deaeration of the at least one brake application device connected to the relevant pressure regulating channel.

The common electronic control device then advantageously regulates the pressure in all the pressure regulating channels, and consequently all the control and regulation routines, or the entire control electronics relating to the electrical brake circuit, are integrated in the electronic control device of the pressure regulating module, such that no further electronic components are required outside the pressure regulating module. In relation to EP 1 122 142 A1 cited in the introduction, with an electrical control device separate from the pressure regulating module, said measure has the advantage that all the control and regulating components relating to the electropneumatic brake can be accommodated in a single housing, and therefore the cabling (data bus) between the control device and the pressure regulating modules, together with plugs and fastening brackets, as is known from the prior art, can be dispensed with. Consequently, said type of system architecture constitutes a very cheap and fail-safe solution in particular for two-axle vehicles, because then no further pressure regulating modules or control units are required aside from the pressure regulating module according to the present invention.

It therefore may be particularly preferable for at least the electromagnetically actuable valve devices assigned to the pressure regulating channels, the pressure sensors and the electronic control device to be accommodated in a common module housing.

The pressure regulating module according to the present invention may be configured such that
a) a printed circuit board which bears components of the electronic control device, electrical external contacts for connecting the printed circuit board to external units, the pressure sensors (88, 90), and electrical contacts connected to the printed circuit board are arranged in or on a housing part, whereas
b) the electromagnetically actuated valve devices, electrical contacts assigned to the electrical contacts of one housing part, and pressure channels connected to the working pressure ports are arranged in a further housing part, wherein
c) the two housing parts are detachably connected to one another and, when the two housing parts are connected, the electrical contacts assigned to one another are electrically connected to one another, and the pressure sensors and openings of the pressure channels are pneumatically connected to one another.

In this way, the required electrical and pneumatic connections are produced simultaneously in one working step in which the two housing halves are connected to one another, which results in highly economical production of the pressure regulating module according to the present invention.

It would alternatively also be possible for the pressure sensors to be accommodated in the housing part in which the electromagnetically actuated valve devices are also arranged, wherein in this case, the pneumatic connections between the working ports and the pressure sensors are already formed in the relevant housing part. Then, however, it is necessary for electrical contacts which can be placed in connection during the assembly of the housing parts to additionally be provided in the two housing parts, in order that the signals representing the actual working pressure can then be input by the pressure regulating modules into the electronic control device via the electrical signal connection which is then created.

The pressure regulating module according to the present invention may be arranged on a frame of a utility vehicle, substantially centrally between the axles whose brake application devices are connected to the respective working pressure ports, for example substantially centrally between the front axle and the rear axle. Since the pressure regulating module attached to the vehicle frame is then arranged outside a driver's cab and is exposed to moisture, spray water and dirt, corresponding sealing measures must be implemented in the module housing.

In the case of an electropneumatic brake system of a vehicle comprising at least one pressure regulating module according to one of the embodiments described above, therefore, two pressure regulating channels, having separate pneumatic circuits, may be provided for the brake application devices of two axles, which may be for a front axle and a rear axle. In this case, the pressure regulating module is a 2-channel pressure regulating module with pressure regulating channels, having separate pneumatic circuits, for the front and rear axles.

Here, for brake application devices of each further axle, for example a second rear axle or lifting axle, at least one further, for example single-channel pressure regulating module may be provided whose electronic control device communicates with the electronic control device of the 2-channel pressure regulating module for example via a data bus.

Not least, ABS pressure control valves which are controlled by the electronic control device of the 2-channel pressure regulating module may be interposed between the working pressure ports of the 2-channel pressure regulating module and the brake application devices of the front axle and the rear axle, which ABS control valves then serve for increasing, maintaining and reducing pressure within the context of the ABS functions.

More precise details will emerge from the following description of exemplary embodiments.

Below, exemplary embodiments of the present invention are illustrated in the drawing and are explained in more detail in the following description.

DETAILED DESCRIPTION

Figure 1:
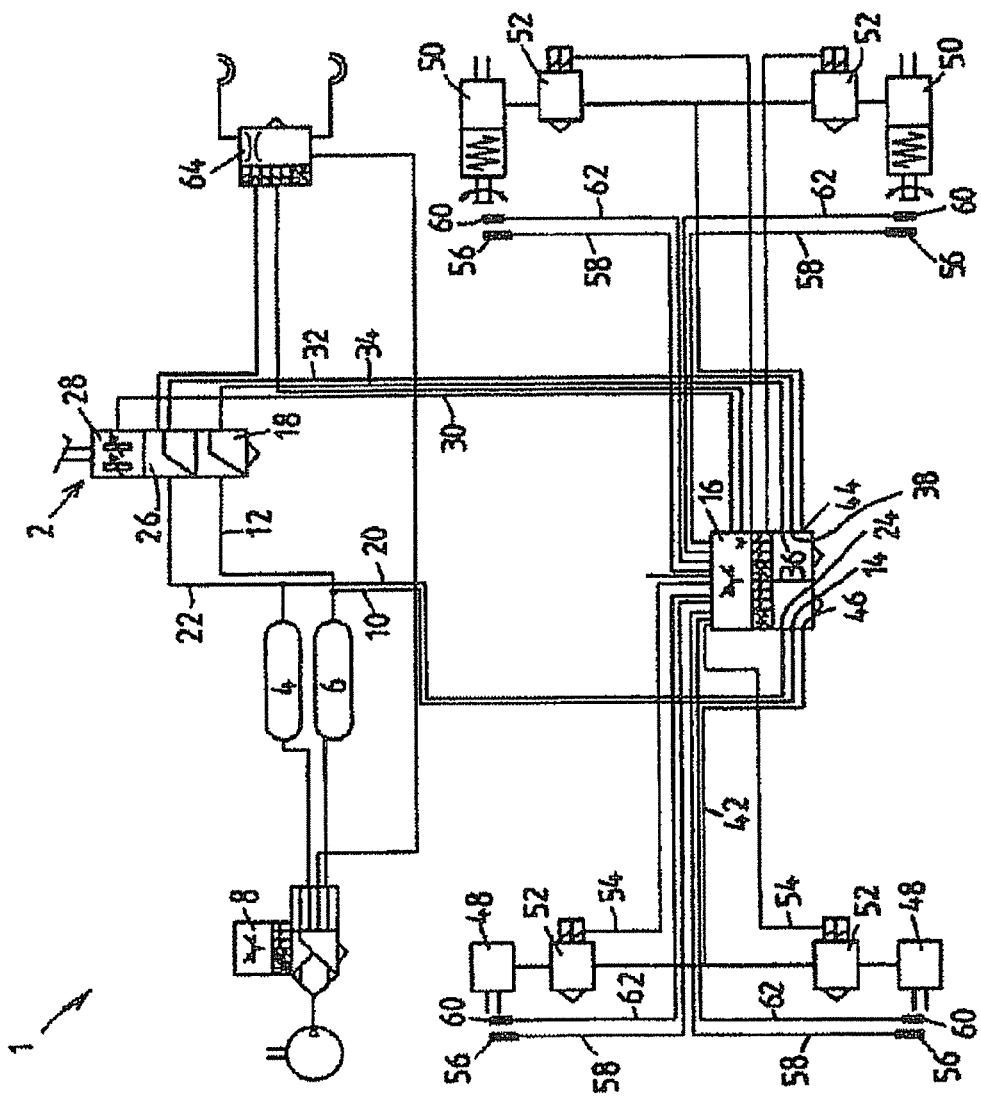
FIG. 1 shows a schematic circuit diagram of an electropneumatic brake system of a utility vehicle having a pressure regulating module according to an exemplary embodiment of the present invention.

FIG. 1 shows a circuit diagram of an electropneumatic service brake system 1 of a utility vehicle having a foot brake transducer 2, having a front axle storage pressure reservoir 4 for providing a supply to a front axle pressure circuit or a front axle pressure channel, and having a rear axle storage pressure reservoir 6 for providing a supply to a rear axle pressure circuit or rear axle pressure channel.

The air supply, air treatment and fuse protection is realized, as is legally prescribed, by an air treatment module 8 not described in any more detail here.

The rear axle storage pressure reservoir 6 is connected via pneumatic supply lines 10, 12 firstly to a rear axle store port 14 of a 2-channel pressure regulating module 16 and to a front axle foot brake valve 18 of the foot brake transducer 2.

Similarly, the front axle storage pressure reservoir 4 is connected via pneumatic supply lines 20, 22 to a front axle store port 24 of the 2-channel pressure regulating module 16 and to a rear axle foot brake valve 26 of the foot brake transducer 2.

The foot brake transducer 2 therefore comprises two pneumatically acting foot brake valves 18, 26 which, as a function of a braking demand predefined by the foot of the driver, each generate a pneumatic backup pressure or control pressure at the outlets of the foot brake valves 18, 2-6. Formed parallel to this in the foot brake transducer 2 so as to be combined in one electrical channel 28 are an electrical front axle channel and an electrical rear axle channel, which as a function of the braking demand input in each case one braking demand signal into an electrical connection, which may be formed as a data bus 30, between the foot brake transducer 2 and the 2-channel pressure regulating module 16 which can distinguish between the two braking demand signals, which differ for example for load reasons, for the front axle and the rear axle.

Furthermore, the front axle foot brake valve 18 and the rear axle foot brake valve 26 of the foot brake transducer 2 are connected in each case via a pneumatic control line 32, 24 to associated backup ports 36, 38 of the 2-channel pressure regulating module 16. Finally, in each case one pneumatic brake line 40, 42 leads from in each case one working pressure port 44, 46 of the 2-channel pressure regulating module 16 to brake application devices 48, 50 at each wheel of the front axle and of the rear axle, wherein one pressure control valve 52 for the ABS operation may be provided per wheel in said pneumatic brake lines 40, 42. Said ABS pressure control valves 52 are actuated by the 2-channel pressure regulating module 16 via electrical control lines 54.

Rotational speed sensors 56 transmit the present rotational speed of the wheels of the two-axle vehicle via electrical signal lines 58 to the 2-channel pressure regulating module 16. Wear sensors 60 may be provided for each wheel brake, which wear sensors, as a function of the present brake wear, input signals into the 2-channel pressure regulating module 16 via signal lines 62.

Not least, a trailer control module 64 such as is known per se is provided which firstly receives a pneumatic control pressure from the rear axle foot brake valve 26 of the foot brake transducer 2 and secondly also receives an electrical signal from the 2-channel pressure regulating module 16.

The brake application devices 50 of the rear axle may be configured as known combination cylinders, that is to say as a combination of an active service brake cylinder and of a passive spring brake cylinder. In this connection, "active" means that the service brake cylinders are applied when aerated and released when deaerated, and "passive" means that the spring brake cylinders are applied when deaerated and released when aerated. In contrast, only active service brake cylinders 48 are provided at the wheels of the front axle.

The electropneumatic 2-channel pressure regulating module 16 has two separately regulable pressure regulating channels, wherein a regulated working pressure, acting at the associated working pressure ports 44, 46, for the brake application devices 48, 50 of the front axle and of the rear axle is generated for each pressure regulating channel on the basis of working air originating from an associated compressed air store (front axle compressed air store 4 and rear axle compressed air store 6) and as a function of the braking demand signals of the foot brake transducer 2.

To form pressure regulating channels which have separate pneumatic circuits (for example in this case: front axle pressure regulating channel and rear axle pressure regulating channel), each pressure regulating channel is consequently assigned a dedicated compressed air store 4, 6, wherein the pneumatic flow paths of each pressure regulating channel are formed so as to be pneumatically separate, proceeding from the associated compressed air store 4, 6 via the associated working pressure ports 44, 46 as far as the respective brake application devices 48, 50, from the pneumatic flow path of a respective other pressure regulating channel.

In particular, for each of the pressure regulating channels (front axle pressure regulating channel and rear axle pressure regulating channel), there is provided a separate compressed air store 4, 6 and, on the 2-channel pressure regulating module 16, in each case one separate store port 14, 24 for connecting the respectively associated compressed air store 4, 6.

To form an electropneumatic brake system with primarily electrically actuated pressure regulating channels (front axle pressure regulating channel and rear axle pressure regulating channel) and a subordinate pneumatic fallback level in the event of a failure of the electrics, each pressure regulating channel may be assigned a dedicated backup circuit, having a dedicated backup port 36, 38 on the 2-channel pressure regulating module 16 for the introduction of a pneumatic backup or control pressure which is derived from the storage pressure of the compressed air store 4, 6 assigned to the respective pressure regulating circuit and which is formed by the brake, transducer 2, from which backup or control pressure the working pressure at the working pressure port 44, 46 of the respective pressure regulating channel is formed in the event of a failure of electrical components.

Alternatively, in the case of vehicles in which the foot brake transducer 2 has only one pneumatic foot brake valve and which are to be retrofitted with the 2-channel pressure regulating module 16 according to the present invention, it would be possible for said pressure regulating module to have only a single backup port for the introduction of a pneumatic backup pressure generated by the foot brake transducer 2, from which backup pressure separate working pressures are formed at the working pressure ports 44, 46 of the pressure regulating channels by an integrated circuit separation arrangement in the event of a failure of electrical components. In this variant, the same backup pressure acts for example on the relay pistons of the relay valves of both brake circuits. In countries with brake regulations corresponding to ECE R13, suitable circuit separation may be provided between the backup pressure or control pressure of one brake circuit and the working pressure derived from the storage pressure of the other circuit, for example by a double piston seal with intermediate ventilation on the relay piston.

Figure 2:
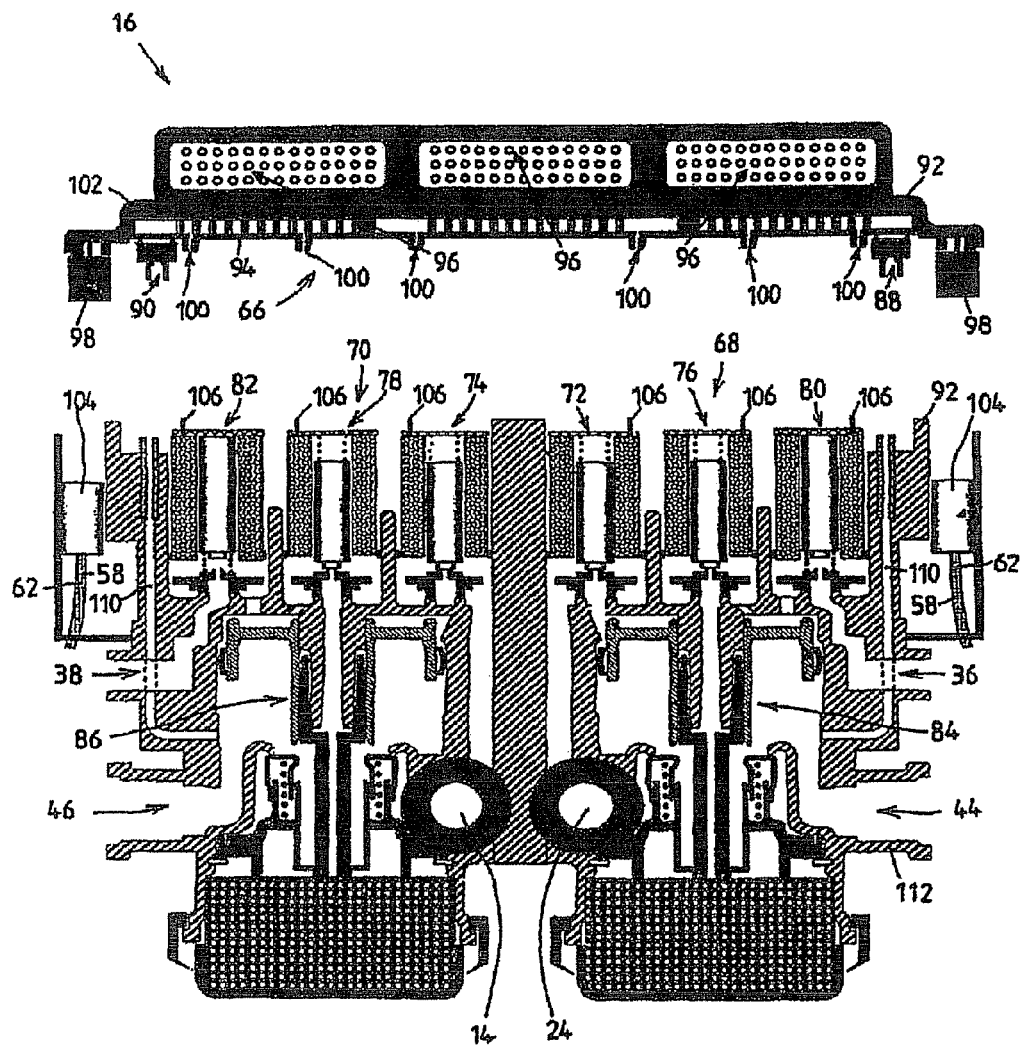
FIG. 2 shows a schematic cross-sectional view through the pressure regulating module of FIG. 1 in an exploded illustration.

According to FIG. 2, a 2-channel pressure regulating module 16 may include an electronic control device 66 which executes all the routines necessary for the pressure regulation by the pressure regulating channels (front axle pressure regulating channel and rear axle pressure regulating channel) and which generates for each pressure regulating channel an electrical control signal corresponding to a setpoint working pressure as a function of the electrical braking demand signals of the foot brake transducer 2. Furthermore, in the 2-channel pressure regulating module 16, there is provided for each pressure regulating channel (front axle pressure regulating channel and rear axle pressure regulating channel) a dedicated electromagnetically actuated valve device 68, 70 which, as a function of the electrical control signals of the electronic control device 66, generates from the storage pressure of the associated compressed air store 4, 6 an actual working pressure for the working pressure port 44, 46 assigned to the respective pressure regulating channel.

An electromagnetically actuated valve device 68, 70 of said type may include in each case one inlet valve 72, 74, an outlet valve 76, 78 and a backup or fallback valve 80, 82. To deal with relatively large air quantities, it is also possible for the inlet valve 72, 74 and the outlet valve 76, 78 to actuate in each case one control port of a relay valve 84, 86 which then generates the working pressure. The mode of operation of such electromagnetically actuated valve devices 68, 70 is well known, for example from EP 0 845 397 A2, such that this will not be discussed in any more detail here.

Furthermore, for each pressure regulating channel (front axle pressure regulating channel and rear axle pressure regulating channel), at least one pressure sensor 88, 90 is provided in the 2-channel pressure regulating module 16, which pressure sensor, as a function of the actual working pressure output by the associated electromagnetically actuated valve device 68, 70, inputs a signal into the electronic control device 66 for comparison with the respective setpoint working pressure, for the regulated aeration and deaeration of the brake application devices 48, 50 connected to the relevant pressure regulating channel.

The common electronic control device 66 then regulates the pressure in all the pressure regulating channels (front axle pressure regulating channel and rear axle pressure regulating channel), and consequently all the control and regulation routines, or the entire control electronics relating to the electrical brake circuit, are integrated in the electronic control device 66 of the 2-channel pressure regulating module 16. Furthermore, it may be preferable for routines of driving dynamics stability programs such as ESP (electronic stability program), ASR (drive slip regulation) and/or RSP (rollover stability) to also be implemented in the electronic control device 66, which may then also intervene in the engine control.

It therefore may be particularly preferable for at least the electromagnetically actuable valve devices 68, 70 assigned to the pressure regulating channels (front axle pressure regulating channel and rear axle pressure regulating channel), the pressure sensors 88, 90 and the electronic control device 66 to be accommodated in a common module housing 92.

As can be seen from FIG. 2, the 2-channel pressure regulating module 16 may be configured such that a printed circuit board 94 which bears components of the electronic control device 66, electrical external contacts 96 such as bushes for connecting the printed circuit board 94 to a vehicle data bus not shown here, the pressure sensors 88, 90, and electrical plug contacts 98, 100 connected to the printed circuit board 94 are arranged in or on a housing part 102 designed for example as a head part, whereas the electromagnetically actuated valve devices 68, 70 with electrical plug contacts 104, 106 complementary to the electrical plug contacts 98, 100 of one housing part 102 and with pressure channels 108, 110 connected to the working pressure ports 44, 46 there are arranged in a further, in this case for example lower housing part 112. The two housing parts 102, 112 are detachably connected to one another, wherein, when the housing parts 102, 112 are connected, the electrical contacts 98, 104 and 100, 106 assigned to one another are electrically connected to one another, and the pressure sensors 88, 90 are pneumatically connected with their pressure measurement side to openings of the pressure channels 108, 110 for the measurement, by the pressure sensors 88, 90, of the actual working pressure acting at the working pressure ports 44, 46.

The plug contacts 100 may be formed on the printed circuit board 94 and are automatically joined to the plug contacts 106, which are formed in each case at the head side on the electromagnetically actuated valves 72, 74 and 76, 78 and 80, 82, when the housing parts 102, 112 are assembled. In this way, said valves can be actuated by the electronic control device 66 or by the printed circuit board 94 thereof. Secondly, the plug contacts 98 and 104 then also come into conductive engagement with one another, and these input wheel-related signals such as the wheel rotational speed and the lining wear from the rotational speed sensors 56 and the wear sensors 60 respectively via the signal lines 58, 62 for example into the lower housing part 112, and said signals are then input from there via the plug contacts 98, 104 into the printed circuit board 94 in order to supply corresponding data to the electronic control device 66 in order to be able to implement the integrated ESP, ABS and ASR functions and possibly even further functions.

It would alternatively also be possible for the pressure sensors 88, 90 to be accommodated in the lower housing part 112 in which the electromagnetically actuated valve devices 68, 70 are also arranged, wherein in this case, the pneumatic connections between the working pressure ports 44, 46 and the pressure sensors 88, 90 are already formed in the relevant housing part 112. Then, however, it is necessary for electrical contacts which can be placed in connection during the assembly of the housing parts 102, 112 to additionally be provided on the two housing parts 102, 112, in order that the signals representing the actual working pressure can then be input by the pressure sensors 88, 90 into the electronic control device 66 via the electrical signal connection which is then created.

Figure 3A:
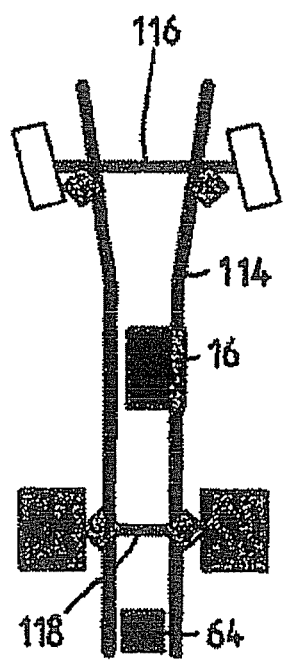
FIGS. 3A and 3B show highly schematic views of system architectures of electropneumatic brake systems comprising a pressure regulating module according to FIG. 2.

The 2-channel pressure regulating module 16 according to the present invention may be arranged on a frame 114 of a utility vehicle, substantially centrally between the front axle 116 and the rear axle 118, as can be seen in particular from FIG. 3A.

Figure 3B:
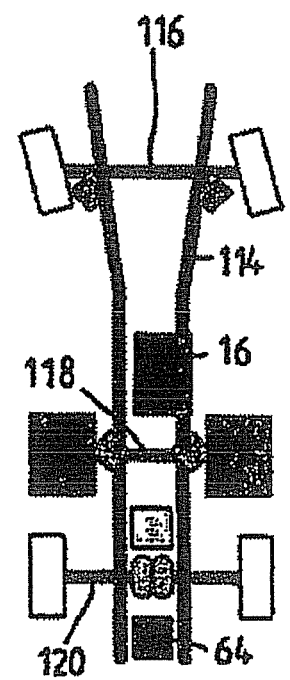

In the case of an electropneumatic brake system of a vehicle comprising a 2-channel pressure regulating module 16 as described above, therefore, two pressure regulating channels (front axle pressure regulating channel and rear axle pressure regulating channel) having separate pneumatic circuits may be provided for the brake application devices 48, 50 of the front axle 116 and of the rear axle 118, wherein for the brake application devices of each further axle, for example a second rear axle or lifting axle 120 as shown in FIG. 3B, for example one further, in this case for example single-channel pressure regulating module 122 may be provided whose electronic control device then communicates with the electronic control device 66 of the 2-channel pressure regulating module 16 via a data bus.

Instead of a front axle 116 and a rear axle 118, it is possible with the 2-channel pressure regulating module 16 for a pressure regulating channel having a separate pneumatic circuit to be assigned to at least one rear axle and for a pressure regulating channel having a separate pneumatic circuit to be assigned to at least one further rear axle. The pressure regulating module 16 according to the present invention is also not restricted to two channels, but rather may have more than two channels.

During normal operation, the 2-channel pressure regulating module 16 is actuated by the electrical channel 28 of the foot brake transducer 2 by a braking demand signal via the data bus 30, whereupon the electronic control device 66 of said pressure regulating module, corresponding to said specification, controls a working or brake pressure for the pressure regulating channels of the front axle 116 and of the rear axle 118 on the basis of the respective storage pressure in the respective compressed air store 4, 6 to the brake cylinders 48, 50. The pneumatic foot brake valves 18, 26 of the foot brake transducer 2 likewise input backup or control pressures for each pressure regulating channel (front axle pressure regulating channel and rear axle pressure regulating channel) separately into the two backup ports 36, 38 of the 2-channel pressure regulating module 16, wherein the backup or fallback valves 80, 82 there are switched into the blocking position, because the electrical actuation has priority.

In the event of a failure of the electronics, compressed air from the two compressed air stores 4, 6 is input via the backup or fallback valves 80, 82, now switched into a pass-through position in the 2-channel pressure regulating module 16, into the brake cylinders 48, 50 via the two backup brake circuits, that is to say via the two foot brake valves 18, 26 and the two pneumatic control lines 32, 34. Said two backup brake circuits then form the fallback for the electronic regulation and are adequate for generating the legally prescribed auxiliary braking action.

The list of reference numerals is as follows:
1 Service brake system
2 Foot brake transducer
4 Front axle storage pressure reservoir
6 Rear axle storage pressure reservoir
8 Air treatment module
10 Supply line
12 Supply line
14 Rear axle store port
16 2-channel pressure regulating module
18 Front axle foot brake valve
20 Supply line
22 Supply line
24 Front axle store port
26 Rear axle foot brake valve
28 Electrical channel
30 Data bus
32 Control line
34 Control line
36 Backup port
38 Backup port
40 Brake line
42 Brake line
44 Working pressure port
46 Working pressure port
48 Brake application device, front axle
50 Brake application device, rear axle
52 Pressure control valve
54 Electrical control line
56 Wheel speed sensors
58 Electrical control lines
60 Wear sensors
62 Electrical control lines
64 Trailer control module
66 Electronic control device
68 Valve device
70 Valve device
72 Inlet valve
74 Inlet valve
76 Outlet valve
78 Outlet valve
80 Backup valve
82 Backup valve
84 Relay valve
86 Relay valve
88 Pressure sensor
90 Pressure sensor
92 Module housing
94 Printed circuit board
96 External contacts
98 Plug contacts
100 Plug contacts
102 Housing part
104 Plug contacts
106 Plug contacts
108 Pressure channel
110 Pressure channel
112 Housing part
114 Frame
116 Front axle
118 Rear axle
120 Lifting axle
122 Pressure regulating module

The invention claimed is:

1. An electropneumatic pressure regulating module, formed as a structural unit, for an electropneumatic brake system of a vehicle, comprising:
   at least two separately regulable pressure regulating channels, wherein a regulated working pressure, acting at at least one working pressure port, for at least one brake application device of the brake system is generated for each pressure regulating channel based on working air originating from a respective compressed air store and as a function of braking demand signals of a brake transducer;
   wherein to form pressure regulating channels having separate pneumatic circuits, each pressure regulating channel is assigned at least one dedicated storage pressure port which can be connected to one of the respective compressed air stores, and wherein the pneumatic flow paths of each pressure regulating channel are formed so as to be pneumatically separate, from the respective storage pressure port as far as the respective working pressure port, from the pneumatic flow paths of a respective other pressure regulating channel, wherein each pressure regulating channel is assigned a dedicated backup circuit, each circuit comprising:

a dedicated backup port for the introduction of a pneumatic backup pressure which is derived from the storage pressure of the respective compressed air store assigned to the respective pressure regulating circuit and which is formed by the brake transducer, from which backup pressure the working pressure at the working pressure port of the respective pressure regulating channel is formed in the event of a failure of at least one electrical component, and wherein when the failure occurs, compressed air from the two compressed air stores is input via backup or fallback valves, now switched into a pass-through position in a 2-channel pressure regulating module, into the brake cylinders via the two backup brake circuits, which then form the fallback for the electronic regulation and are adequate for generating an auxiliary braking action.

2. The pressure regulating module of claim 1, further comprising: the working pressure port connects to at least one brake application device of one axle; and at least one further working pressure port connects to another brake application device of at least one further axle.

3. The pressure regulating module of claim 1, wherein the pneumatic flow paths of each backup circuit are formed so as to be pneumatically separate, from the associated backup port as far as the associated working pressure port, from the pneumatic flow paths of a respective other backup circuit.

4. The pressure regulating module of claim 1, further comprising:

a single backup port for the introduction of a pneumatic backup pressure generated by the brake transducer, from which backup pressure separate working pressures are formed at the working pressure ports of the pressure regulating channels by an integrated circuit separation arrangement in the event of a failure of at least one electrical component.

5. The pressure regulating module of claim 1, wherein one of the pressure regulating channels is assigned to at least one front axle, and the other pressure regulating channel is assigned to at least one rear axle.

6. The pressure regulating module of claim 1, further comprising:

an electronic control device which executes all the routines necessary for the pressure regulation by the pressure regulating channels and which generates for each pressure regulating channel an electrical control signal corresponding to a setpoint working pressure as a function of electrical braking demand signals of the brake transducer;

for each pressure regulating channel, a dedicated electromagnetically actuated valve device which, as a function of the electrical control signals of the electronic control device, generates from the storage pressure of the associated compressed air store an actual working pressure for the working pressure port assigned to the respective pressure regulating channel; and for each pressure regulating channel, at least one pressure sensor which, as a function of the actual working pressure output by the associated electromagnetically actuated valve device, inputs a signal into the electronic control device for comparison with the respective setpoint working pressure, for the regulated aeration and deaeration of the at least one brake application device connected to the relevant pressure regulating channel.

7. The pressure regulating module of claim 6, wherein a common electronic control device regulates the pressure in the pressure regulating channels.

8. The pressure regulating module of claim 6, wherein at least the electromagnetically actuated valve devices assigned to the pressure regulating channels, the at least one pressure sensor and the electronic control device are accommodated in a common module housing.

9. The pressure regulating module of claim 8, wherein:

a printed circuit board which bears components of the electronic control device, electrical external contacts for connecting the printed circuit board to external units, the pressure sensors, and electrical contacts connected to the printed circuit board are arranged in or on a housing part, the electromagnetically actuated valve devices, electrical contacts assigned to the electrical contacts of one housing part, and pressure channels connected to the working pressure ports are arranged in a further housing part, and the two housing parts are detachably connected to one another and, when the two housing parts are connected, the electrical contacts assigned to one another are electrically connected to one another, and the pressure sensors and openings of the pressure channels are pneumatically connected to one another.

10. An electropneumatic brake system of a vehicle, comprising:

at least one pressure regulating module, formed as a structural unit including:

at least two separately regulable pressure regulating channels, wherein a regulated working pressure, acting at at least one working pressure port, for at least one brake application device of the brake system is generated for each pressure regulating channel based on working air originating from a respective compressed air store and as a function of braking demand signals of a brake transducer;

wherein to form pressure regulating-channels having separate pneumatic circuits, each pressure regulating channel is assigned at least one dedicated storage pressure port which can be connected to one of the respective compressed air stores, wherein the pneumatic flow paths of each pressure regulating channel are formed so as to be pneumatically separate, from the respective storage pressure port as far as the respective working pressure port, from the pneumatic flow paths of a respective other pressure regulating channel, wherein each pressure regulating channel is assigned a dedicated backup circuit comprising:

a dedicated backup port for the introduction of a pneumatic backup pressure which is derived from the storage pressure of the respective compressed air store assigned to the respective pressure regulating circuit and which is formed by the brake transducer, from which backup pressure the working pressure at the working pressure port of the respective pressure regulating channel is formed in the event of a failure of at least one electrical component, and wherein when the failure occurs, compressed air from the two compressed air stores is input via backup or fallback valves, now switched into a pass-through position in a 2-channel pressure regulating module, into the brake cylinders via the two backup brake circuits, which then form the fallback for the electronic regulation and are adequate for generating an auxiliary braking action.

11. The electropneumatic brake system of claim 10, wherein pressure control valves controlled by the electronic control device of the 2-channel pressure regulating module are interposed between the working pressure ports of the 2-channel pressure regulating module and the brake application devices.

12. The electropneumatic brake system of claim 10, further comprising:
   two axles, each axle provided with at least one of the brake application devices,
   wherein the pressure regulating module is a 2-channel pressure regulating module and has two pressure regulating channels, having separate pneumatic circuits, for the brake application devices of the two axles.

13. The electropneumatic brake system of claim 12, further comprising:
   at least one additional axle,
   at least one additional brake application device associated for use with the additional axle,
   at least one additional pressure regulating module having an additional electronic control device,
   the additional electronic control device communicating with the electronic control device of the 2-channel pressure regulating module.

14. The electropneumatic brake system of claim 12, wherein the 2-channel pressure regulating module is arranged on a frame of the vehicle, substantially centrally between the axles whose brake application devices are connected to the respective working pressure ports of the 2-channel pressure regulating module.

\* \* \* \* \*